Dec. 2, 1969          R. G. CARON          3,481,416
                      SNOW VEHICLE
Filed Nov. 9, 1967                    4 Sheets-Sheet 1
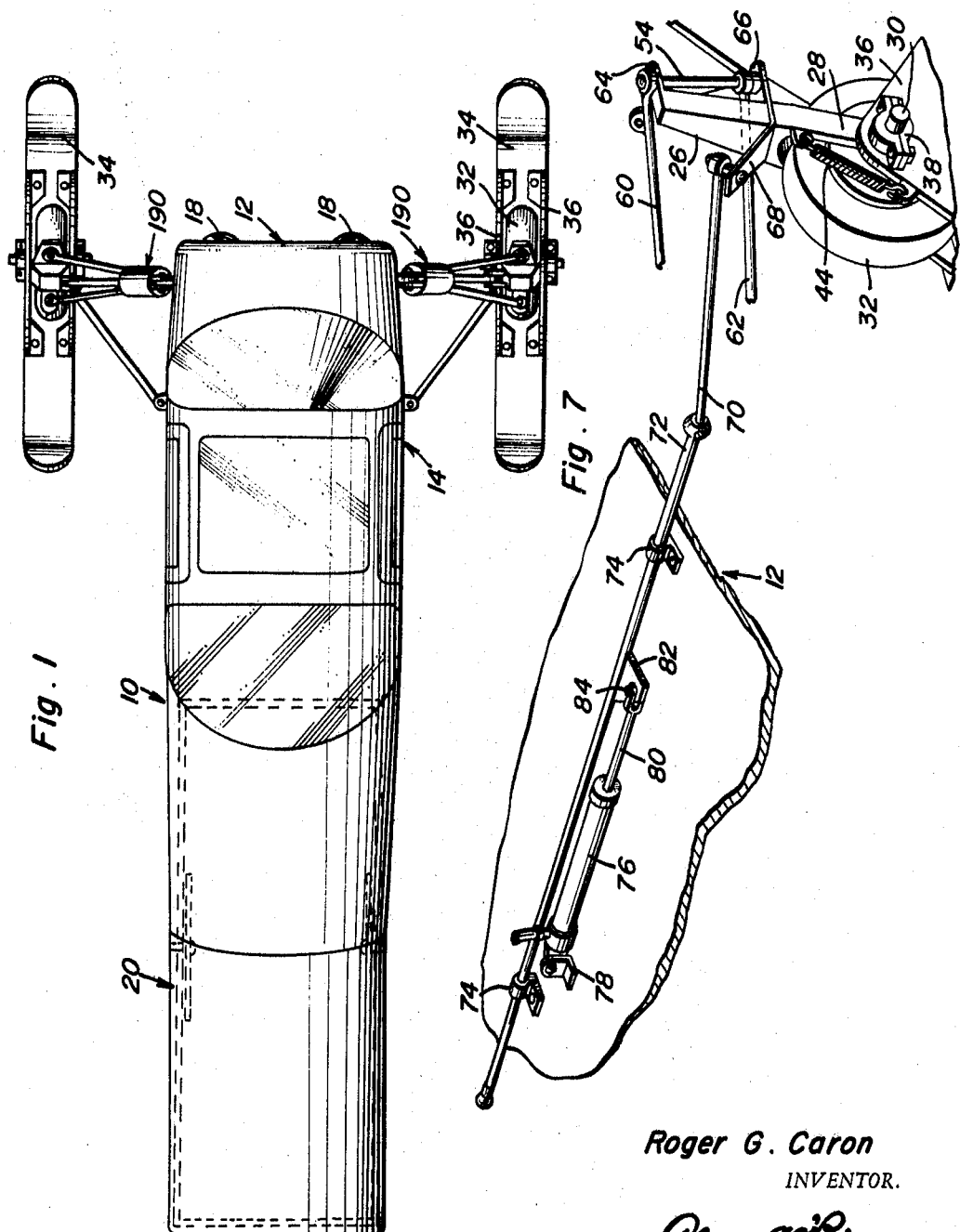
Roger G. Caron
INVENTOR.

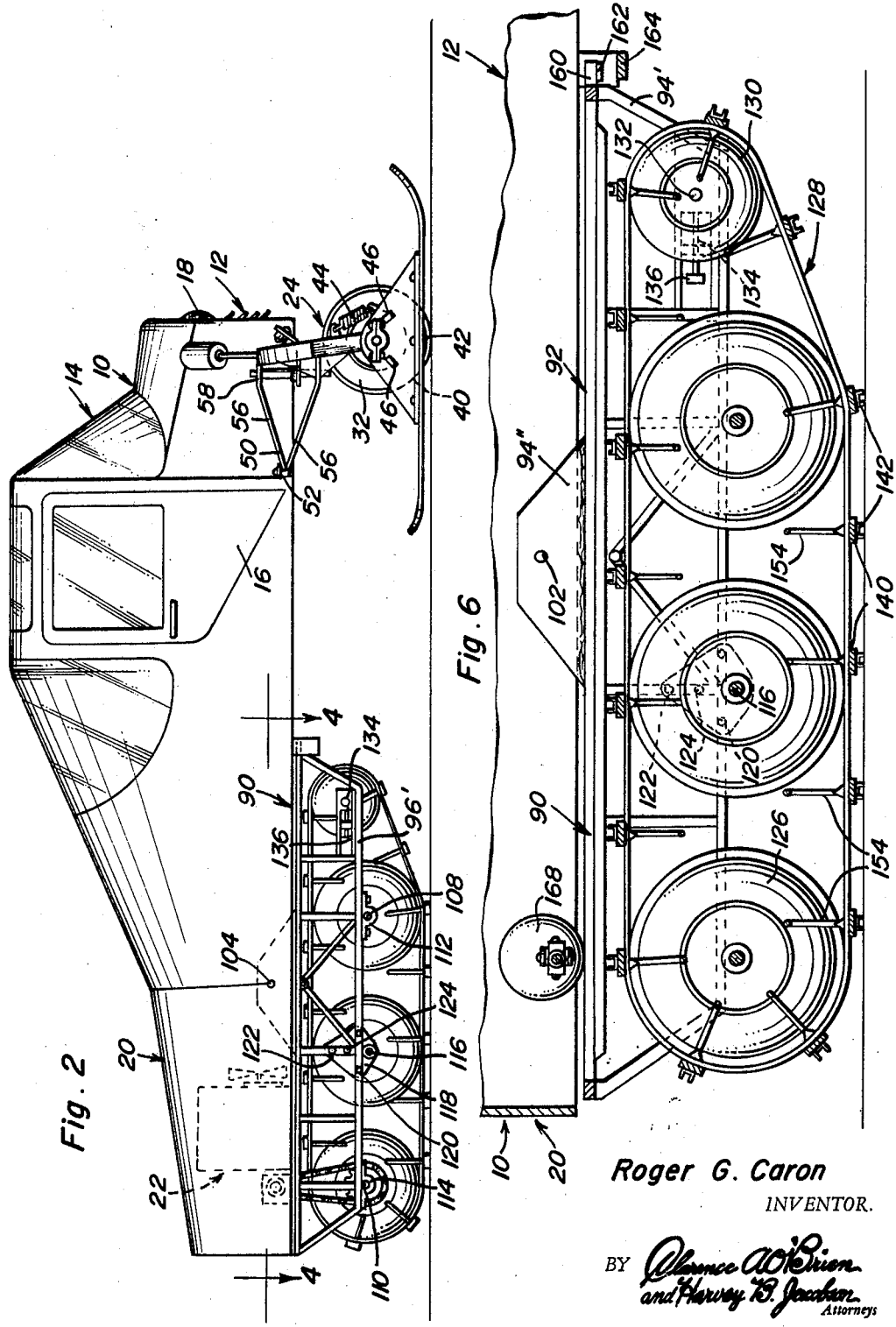

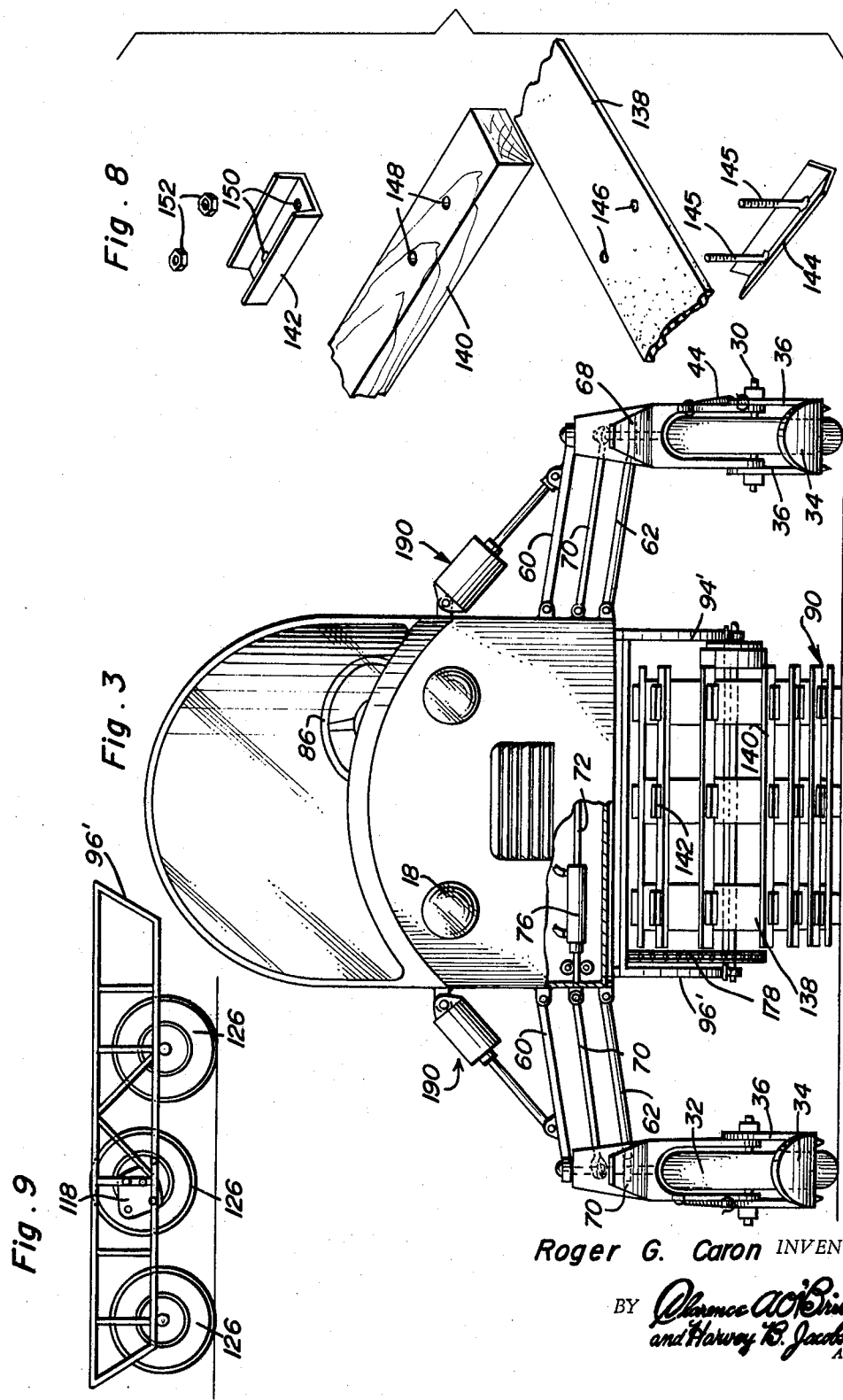

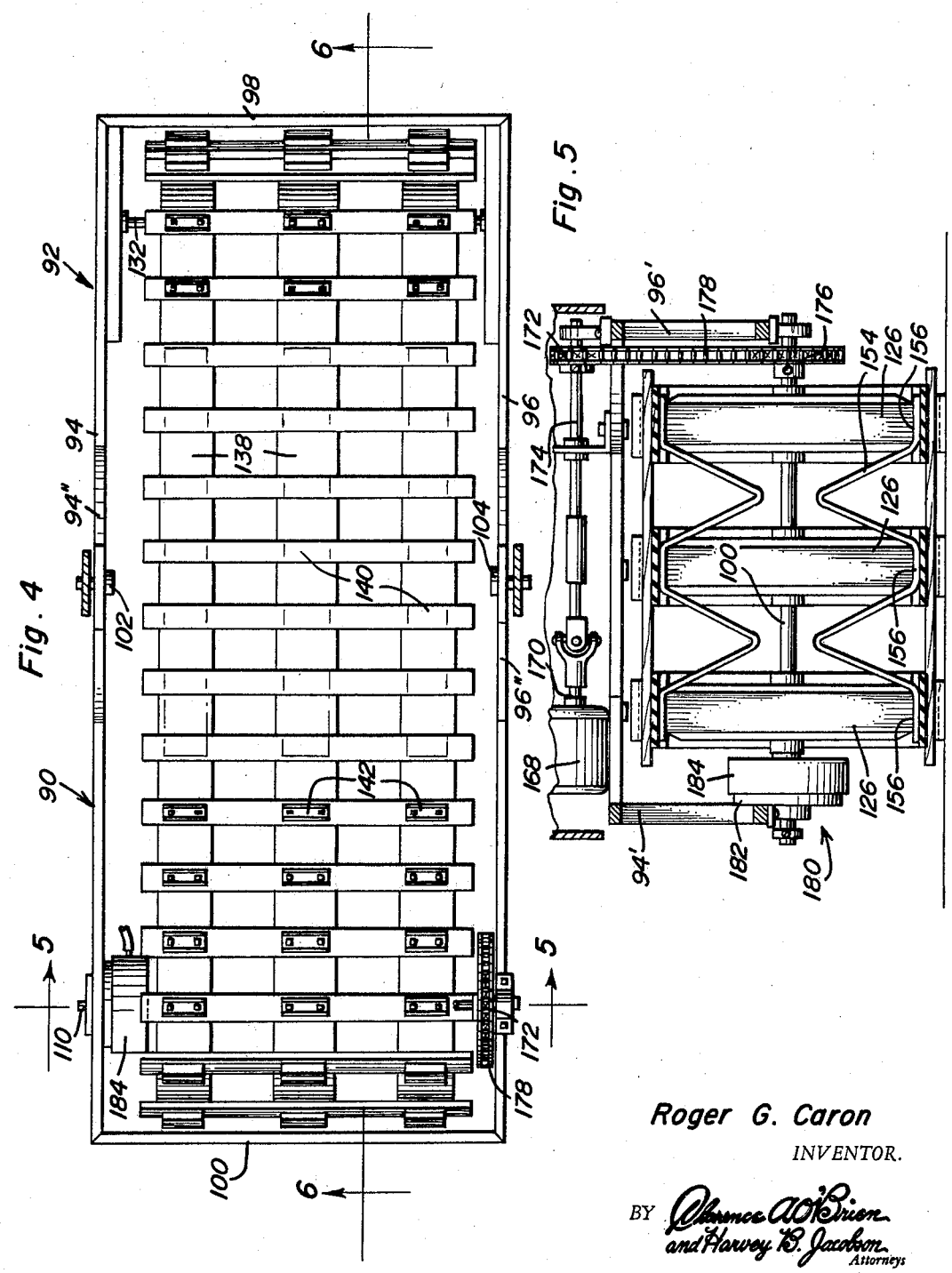

United States Patent Office 3,481,416
Patented Dec. 2, 1969

3,481,416
SNOW VEHICLE
Roger G. Caron, Sanford, Maine
(R.F.D. 2, Limerick, Maine 04048)
Filed Nov. 9, 1967, Ser. No. 681,783
Int. Cl. B62m 27/00; B62d 55/00, 55/08
U.S. Cl. 180—5                    4 Claims

ABSTRACT OF THE DISCLOSURE

A vehicle including front and rear ends with steerable ground engaging support means at one end of the vehicle and crawler tread support and drive means supported at the other end of the vehicle for oscillation about a horizontal axis extending transversely of the vehicle, prime mover means for driving the crawler tread and support drive means being supported from the latter for oscillation therewith.

---

The snow vehicle of the instant invention has been designed primarily for use as a transportation vehicle and is particularly well adapted for operation in deep snow. The crawler tread assembly of the vehicle includes a lower reach of considerable length with which three longitudinally spaced support rollers are rollingly engaged and the center support roller is supported from the crawler tread assembly for adjustable vertical positioning whereby when the vehicle is to be utilized for transportation over rough ground surfaces not covered with snow the center portion of the lower reach of the crawler tread assembly may be upwardly deflected between the front and rear rollers disposed in rolling engagement with the lower reach of the crawler tread assembly.

The vehicle mounts the crawler assembly at its rear end and is provided with a pair of forward opposite side steerable ground engaging support structures. These support structures include skis for use when the vehicle is traveling over snow and journaled front wheels for use when the vehicle is traveling over bare ground.

In addition, the supporting wheels disposed in rolling engagement with the crawler tread assembly are pneumatic and include more than two axially spaced wheels spaced transversely of the vehicle and disposed in three groups of wheels spaced longitudinally of the vehicle. The endless tread assembly includes novel means by which the endless crawler tread is maintained properly trained about the supporting wheel means.

The main object of this invention is to provide a vehicle which is particularly well adapted to afford transportation over ground surfaces having a deep snowfall thereon as well clear paved and non-paved ground surfaces.

Another object of this invention, in accordance with the immediately preceding object, is to provide a vehicle including a high traction affording crawler tread support and drive assembly including a novel supporting wheel structure for the endless track member and means for driving the endless track member from a plurality of the supporting wheel means.

Yet another object of this invention is to provide a crawler tread support and drive structure which may be readily modified, merely by adjustment, from being particularly well adapted for use in traveling over snow covered surfaces to use in traveling over unsnow covered and rough ground surfaces.

A final object of this invention to be specifically enumerated herein is to provide a vehicle in accordance with the preceding objects which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the vehicle;
FIGURE 2 is a side elevational view of the vehicle;
FIGURE 3 is a front elevational view of the vehicle;
FIGURE 4 is an enlarged fragmentary horizontal sectional view taken substantially upon the plane indicated by the section line 4—4 of FIGURE 2;
FIGURE 5 is an enlarged transverse vertical sectional view taken substantially upon the plane indicated by the section line 5—5 of FIGURE 4;
FIGURE 6 is a fragmentary longitudinal vertical sectional view taken substantially upon the plane indicated by the section line 6—6 of FIGURE 4;
FIGURE 7 is a fragmentary perspective view of one of the steerable front ground engaging support structures and the means by which it may be steered;
FIGURE 8 is a fragmentary exploded perspective view of the endless track assembly of the vehicle; and
FIGURE 9 is a schematic side elevational view of the crawler tread assembly illustrating the manner in which the center wheel means may be vertically raised so as to adapt the crawler tread means for use over rough ground surfaces not having snow thereover.

Referring now more specifically to the drawings, the numeral 10 generally designates the snow vehicle which includes an integral frame and body structure generally referred to by the reference numeral 12. The structure 12 is elongated and includes front and rear ends and defines a driver and passenger compartment generally referred to by the reference numeral 14. The driver and passenger compartment 14 includes opposite side access doors 16 and forwardly facing headlights 18. The structure 12 also defines a rear cover structure referred to in general by the reference numeral 20 for forming a partial enclosure about the prime mover generally referred to by the reference numeral 22.

The front of the frame and body structure 12 is supported from the ground by means of a pair of opposite side steerable ground engaging support assemblies referred to in general by the reference numerals 24. Each support assembly 24 includes an upstanding wheel yoke 26 defining a pair of downwardly projecting furcations 28 between whose lower ends a shaft 30 extends having a ground engaging pneumatic wheel 32 journaled thereon. In addition, each of the assemblies 24 includes a metal ski 34 provided with opposite side upstanding mounting plates 36 which embracingly receive the corresponding wheel 32 therebetween and are oscillatably supported from opposite end portions of the shaft 30 by means of clamp assemblies generally referred to by the reference numerals 38. The skis 34 each has a central opening 40 formed therethrough downwardly through which the lower peripheral portion 42 of the corresponding wheel 32 projects. A stabilizer spring 44 is provided on each support assembly 24 and is connected between the yoke 26 and one of the mounting plates 36. Further, at least the outside mounting plates 36 include limit stops 46 for limiting oscillation of the skis 34 relative to the shafts 30.

Each of the support assemblies includes a V-shaped radius arm assembly 50 secured at its apex to the frame and body structure 12 as at 52 and to the upper and lower ends of a kingpin 54 at the free ends of its arms 56 as at 58. In addition, a pair of upper and lower supporting struts or control arms 60 and 62 are pivotally secured at their inner ends to the structure 12 and secured to the upper and lower ends of the kingpin 54 at their outer ends. The yokes 26 are each provided with vertically spaced journal portions 64 and 66 which rotatably receive the upper and lower ends of the corresponding kingpin and each yoke 26 additionally includes a forwardly and upwardly inclined steering arm 68 to which the outer end of a corresponding control arm 70 is secured. A steering shaft 72 is supported from the structure 12 by means of brackets 74 for longitudinal reciprocation transversely of the vehicle 10 and has its opposite ends connected to the inner ends of the shafts or arms 70. One end of a hydraulic steering cylinder 76 is pivotally supported from the structure 12 by means of a support bracket 78 and the free end portion of the extendable rod portion 80 of the cylinder 76 is pivotally secured to a bracket 82 carried by the rod or shaft 72 as at 84. Accordingly, upon actuation of the cylinder 76 the yokes 26 may be caused to oscillate about generally vertical axes for steering the vehicle 10. Of course, a suitable steering wheel 86 is provided in the driver and passenger compartment 14 and any suitable means may be utilized to actuate the cylinder 76 in response to movement of the steering wheel 86.

Referring now more specifically to FIGURES 4-6 of the drawings there may be seen a crawler tread support and drive structure generally referred to by the reference numeral 90. The structure 90 includes a generally rectangular frame referred to in general by the reference numeral 92. The frame 92 includes opposite side longitudinal members 94 and 96 interconnected at their front and rear ends by means of transverse members 98 and 100. The longitudinally extending members 94 and 96 include depending frame sections 94' and 96' and upwardly projecting mounting plate portions 94'' and 96''. The mounting plate portions are oscillatably supported from the structure 12 at opposite sides of the latter by means of pivot pins 102 and 104 whereby the entire structure 90 is supported from the structure 12 for oscillation about a horizontal transverse axis.

Front and rear support shafts 108 and 110 are journaled from longitudinally spaced portions on the depending structures 94' and 96' by means of journal blocks 112 and 114. A center support shaft 116 is journaled from a pair of opposite side support plates 118 pivotally supported from the depending structures 94' and 96' by means of pivot pins 120 and retained in adjusted position by means of fasteners 122 and 124. The support plates 118 are oscillatable between the positions thereof illustrated in FIGURES 2 and 9 and it may be seen that when the plates are oscillated from the positions illustrated in FIGURE 2 of the drawings to the positions illustrated in FIGURE 9 of the drawings the support shaft 116 is elevated appreciably above the position thereof illustrated in FIGURE 2.

The shafts 108, 110 and 116 each has three axially spaced wheels 126 mounted thereon for rotation therewith and an endles track assembly generally referred to by the reference numeral 128 is provided and trained about all three sets of wheels 126 as well as a set of three tensioning wheels 130 mounted on a shaft 132 journaled from bearing blocks 134 adjustably positionable longitudinally of the frame 92 by means of adjusting screws 136.

The endless track assembly 128 includes three endless belt members 138 interconnected by means of a plurality of wooden connecting members 140 spaced about and extending transversely of the assembly 128. The connecting members 140 are spaced about the outer surfaces of the belts 138 and each has three channel-shaped cleats 142 secured thereto while a V-shaped cleat 144 is carried by the inner portion of each belt 138. The cleats 144 each includes threaded shank portions which are received, through apertures 146 formed in the corresponding belt 138 as well as bores 148 formed through the adjacent section of the corresponding connecting member 140. In addition, the threaded shank portions 145 are also receivable through apertures 150 formed in each channel-shaped metal cleat 142 and have threaded nuts 152 threadedly engaged therewith to secure the threaded shank portions 145 through the belts 138, the connecting members 140 and the metal cleats 142.

Every other connecting member 140 is without cleats 144 but instead includes a W-shaped or double V-shaped guide structure 154 including aligned mounting portions 156 serving the purpose of the cleats 144 and including shank portions (not shown) corresponding to and performing the functions of the shank portions 145. From FIGURES 5 and 6 of the drawings it may be seen that the guide structures 154 are fully operative to provide a guiding action for maintaining the endless track assembly 128 properly trained about the wheels 126 and 130. The V-shaped portions of each guide structure 154 engage the adjacent sides of pairs of adjacent wheels 126 and 130 on the same support shaft and therefore the endless track assembly 128 is prevented from shifting laterally relative to the support wheels 126 and 130. Further, the rear driving wheels 126 are frictionally engaged not only with the belts 138, but also the cleats 144 to provide driving traction between the rear wheels 126 and the track assembly 128.

The forward end of the frame 92 includes opposite side extension arms 160 having resilient pads 162 secured to their undersurface portions. The pads 162 are engageable with inturned flange portions 164 dependingly supported from the structure 12 and are therefore operative to limit downward swinging movement of the forward end of the structure 90.

The prime mover 22 is supported from the structure 90 for oscillation therewith and is drivingly connected to a transmission 168 also supported from the structure 90. The transmission 168 includes an output shaft 170 which drives a drive sprocket 172 mounted on a shaft 174 suitably journaled from the frame 92 and the drive sprocket 172 is aligned with a driven sprocket 176 mounted on the rear support shaft 110 for rotation therewith. The drive sprocket 172 is drivingly coupled to the driven sprocket 176 by means of an endless chain 178 and therefore the prime mover 22 is operative to drive the wheels 126 carried by the rear shaft 110. Driving of the rearmost wheels 126 will of course drive the endless track assembly 128.

A brake assembly generally referred to by the reference numeral 180 is provided and includes a backing plate assembly 182 supported from the depending structure 94' and a brake drum portion 184 carried by the rear shaft 110 for rotation therewith. Accordingly, the brake assembly 180 may be actuated in any suitable manner so as to brake the rear wheels 126 and thus the endless track assembly 128.

The vehicle 10 is constructed whereby the elevation of the pivot pins 104 which oscillatably support the structure 90 from the structure 12 may be readily changed in elevation relative to the structure 12 and when the vehicle 10 is to be utilized over uneven ground surfaces which are not covered with snow, the skis 34 may be removed and the pivot plates 120 may be released from their positions illustrated in FIGURE 2 of the drawings, pivoted to their positions illustrated in FIGURE 9 of the drawings and secured in the positions illustrated in FIGURE 9 of the drawings in order to raise the center support shaft 116 and thus allow the lower reach of the endless track assembly 128 to be upwardly deflected intermediate the wheels 126 carried by the front and rear shafts 108 and 110. Of course, when the shaft 116 is in the elevated position illustrated in FIGURE 9 of the drawings, the center portion of the upper reach of the endless track assembly 128 is upwardly deflected by the wheels 56 carried by the center shaft 116.

The support assemblies 124 include shock absorber assemblies generally referred to by the reference numerals 190 interconnected between opposite sides of the forward end of the structure 12 and the outer ends of the struts 60. The shock absorbers 190 are pivotally secured at one pair of corresponding ends from the structure 12 and to the outer ends of the struts 60 at the other set of corresponding ends of the shock absorbers 190.

When the plates 118 are swung to and secured in the positions illustrated in FIGURE 9, the endless track assembly 128 may be retained or removed, as desired. If the track assembly 128 is retained, the center portion of the lower reach thereof may be upwardly deflected between the front and rear wheels 126 so as to adapt the assembly 128 to better pass over a rock or the like. However, if the track assembly is removed, only the rear wheels 126 provide motive traction for the vehicle 10 which may be operated at higher speeds over smooth road surfaces and still be able to climb over relatively large rocks at slow speeds when being operated off a road.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A vehicle including front and rear ends, steerable ground engaging support means at one end of said vehicle, crawler tread support and drive means at the other end of said vehicle, said crawler tread support and drive means comprising an elongated frame structure extending longitudinally of said vehicle including an endless track member and a plurality of wheel means spaced longitudinally of said structure and journalled therefrom for rotation about axes extending transversely thereof about which said endless track member is entrained, said frame structure being supported from said vehicle for oscillation about a horizontal axis extending transversely of said vehicle and structure, said wheel means including front and rear wheel assemblies spaced longitudinally along said frame structure and a single intermediate wheel assembly spaced between said front and rear assemblies under which the lower reach of said track member extends, the intermediate wheel assembly being supported from said support frame structure for vertical adjustable positioning between a lowered position with its lower periphery generally horizontally aligned with the lower peripheries of the front and rear wheel assemblies and an upper position with its lower periphery spaced sufficiently above the lower peripheries of said front and rear wheel assemblies to enable the lower reach of said track member to be upwardly deflected between said front and rear wheel assemblies when the latter are disposed on opposite sides of a rise over which said track member extends, said frame pivot axis being disposed in a vertical transverse plane spaced above and between said front and rear wheel assemblies said vehicle including a body portion from which said frame structure is oscillatably supported and prime mover means supported from said frame structure for oscillation therewith and drivingly connected to said endless track member, said prime mover means being substantially enclosed within said body portion.

2. The combination of claim 1 wherein said endless track member includes means defining inwardly projecting and longitudinally spaced members defining a V-shaped guides disposed in planes extending transversely of said endless track member and having their apices disposed inwardly of said track member, said wheel assemblies each including a plurality of axially spaced wheels between which said V-shaped guides are receivable.

3. The combination of claim 2 wherein the wheels of one of said wheel assemblies other than said center wheel assembly are mounted for simultaneous rotation with each other, a prime mover supported from said frame structure and drivingly connected to the wheels of said one wheel assembly.

4. A vehicle including front and rear ends, steerable ground engaging support means at one end of said vehicle, crawler tread support and drive means at the other end of said vehicle, said crawler tread support and drive means comprising an elongated frame structure extending longitudinally of said vehicle including an endless track member and a plurality of wheel means spaced longitudinally of said structure and journalled therefrom for rotation about axes extending transversely thereof about which said endless track member is entrained, said wheel means including a plurality of journalled wheel assemblies spaced longitudinally along said frame structure, each of said wheel assemblies including three axially spaced and aligned wheels, an endless track entrained about said wheel assemblies including three laterally spaced endless flexible belts each entrained about one set of corresponding wheels of said assemblies, a plurality of elongated generally parallel connecting members space longitudinally and extending transversely of said track members, said connecting members extending between and being secured to corresponding outer surface portions of said belts, and pairs of coplanar V-shaped guide members including divergent legs joined at their adjacent ends and spaced about, secured to and projecting inwardly of said belts with the free ends of the remote legs of said guide members secured to the outer belts and the free ends of the adjacent legs of said guide members secured to the center belt, the outside wheels of each wheel assembly passing outwardly of said remote leg free ends and the center wheel of each wheel assembly passing between the adjacent leg free ends, whereby coacting between two wheels of each of said wheel assemblies and two corresponding legs of each pair of V-shaped guide members will prevent shifting of the track member axially of the axes of rotation of said wheel assemblies in each axial direction.

References Cited
UNITED STATES PATENTS

| | | | |
|---|---|---|---|
| 3,019,061 | 1/1962 | Schomers | 305—35 X |
| 3,419,097 | 12/1968 | Nodwell | 180—9.46 |
| 3,435,907 | 4/1969 | Imhoff | 180—5 |
| 2,992,862 | 7/1961 | Fredricks | 305—35 X |
| 1,701,212 | 2/1929 | Nickerson | 280—8 |
| 2,019,482 | 11/1935 | Barnes | 180—9.2 |
| 2,749,189 | 6/1956 | France | 180—5 X |
| 2,925,873 | 2/1960 | Laporte | 180—5 |
| 3,011,576 | 12/1961 | Howes | 180—5 |
| 3,148,743 | 9/1964 | Jarvi | 180—5 |
| 3,213,955 | 10/1965 | Hetteen | 180—5 |

FOREIGN PATENTS

| | | |
|---|---|---|
| 660,773 | 4/1957 | Canada. |

RICHARD J. JOHNSON, Primary Examiner

U.S. Cl. X.R.

305—35, 28; 180—9.5